United States Patent
Miller (10) Patent No.: US 11,661,209 B2
(45) Date of Patent: *May 30, 2023

(54) INCREASED VISIBILITY OF INDICATING MARKERS IN A STRUCTURE AND ASSOCIATED SYSTEM AND METHOD

(71) Applicant: The Boeing Company, Chicago, IL (US)

(72) Inventor: James F. Miller, Berkeley, MO (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,753

(22) Filed: Feb. 18, 2022

(65) Prior Publication Data

US 2022/0169402 A1 Jun. 2, 2022

Related U.S. Application Data

(63) Continuation of application No. 16/733,661, filed on Jan. 3, 2020, now Pat. No. 11,279,499.

(51) Int. Cl.
  *B64F 5/10* (2017.01)
  *G08B 5/36* (2006.01)
  *F16J 15/00* (2006.01)
(52) U.S. Cl.
  CPC .............. *B64F 5/10* (2017.01); *G08B 5/36* (2013.01); *F16J 15/00* (2013.01)
(58) Field of Classification Search
  CPC ............... B64F 5/10; G08B 5/36; F16J 15/00
  See application file for complete search history.

(56) References Cited

U.S. PATENT DOCUMENTS

| | | |
|---|---|---|
| 6,259,654 B1 | 7/2001 | de la Huerga |
| 6,553,696 B1 | 4/2003 | Foster |
| 9,493,267 B1 | 11/2016 | Citrin |
| RE46,842 E | 5/2018 | Phaneuf et al. |
| 2009/0032546 A1 | 2/2009 | Litherland et al. |
| 2016/0026911 A1 | 1/2016 | Morris et al. |
| 2018/0374039 A1 | 12/2018 | Walden et al. |

OTHER PUBLICATIONS

GA Pitot Tube Cover by Plane Sights product overview, https://www.aircraftspruce.com/catalog/pspages/planesights2.php?gclid . . . , accessed Dec. 12, 2019.

*Primary Examiner* — Nabil H Syed
*Assistant Examiner* — Cal J Eustaquio
(74) *Attorney, Agent, or Firm* — Kunzler Bean & Adamson (57) ABSTRACT

Disclosed herein is an indicating marker and method of use for removably attaching the indicating marker to a structure comprising an opening. The indicating marker comprises a cover device configured to removably seal the opening of the structure. At least one light is attached to the cover device. A power source is electrically connectable to the at least one light to emit a visible light from the at least light and illuminate the cover device. Alternatively, a wireless signal emitter is attached to the cover device and is configured to receive a signal from a wireless signal receiver separate from the structure and transmit a wireless response signal to the wireless signal receiver. In one example, both a light and a wireless signal emitter are attached to the cover device.

20 Claims, 4 Drawing Sheets

INCREASED VISIBILITY OF INDICATING MARKERS IN A STRUCTURE AND ASSOCIATED SYSTEM AND METHOD

FIELD

This disclosure relates generally to increasing the visibility of indicating markers within a structure and more particularly to increasing the visibility of indicating markers used to cover openings in a structure during manufacture.

BACKGROUND

Protecting an aircraft from unintended damage, during manufacture of the aircraft, promotes the safety of the aircraft. Foreign object damage (FOD), as it is referred to in the art, can be caused by the introduction of foreign contaminants, into systems and sub-systems of the aircraft. Such foreign contaminants include any substance, debris, or object that would potentially cause FOD or malfunction to the aircraft. FOD can lead to unintended consequences, ranging from minor repairs or unscheduled maintenance to catastrophic events. However, foreign contaminants can be difficult to detect in an aircraft and ensuring that foreign contaminants have been removed from the aircraft before post-production operation of the aircraft (such as before the aircraft leaves a production facility) can be a time and labor intensive endeavor. Furthermore, the confined nature of some portions of an aircraft structure may hinder a thorough visual inspection for foreign contaminants and FOD-prevention markers.

Preventing foreign contaminants from entering and getting inside openings in the aircraft during manufacture helps protect the aircraft from unintended damage. Common openings are those for conduits and hoses forming part of the aircraft. Covering openings during manufacture of the aircraft helps to prevent debris from entering the opening. The openings can be covered with temporary markers that are intended to be removed before post-production of the aircraft. If not removed, the temporary markers can act as foreign contaminants and cause FOD to the aircraft after manufacture. Presently, there are multiple sizes, colors, styles, and types of markers that are used to protect components and openings of an aircraft from foreign contaminants and FOD in general. However, there is no standard color or design of such markers, which can lead to confusion about whether the marker is a permanent or temporary feature of the aircraft. Furthermore, markers can be dark in color and difficult to spot. Accordingly, identifying and removing such temporary markers before production of the aircraft is complete can be difficult.

SUMMARY

The subject matter of the present invention provides examples of indicating markers and corresponding systems and methods that overcome the above-discussed shortcomings of prior art techniques. There is a desire to increase the ability to detect markers in a more effective, efficient, and safe manner. It would therefore be desirable to develop an improved system and method for detecting markers that reduce the time and costs involved in manufacturing of an aircraft. Accordingly, the subject matter of the present application has been developed in response to the present state of the art, and in particular, in response to shortcomings of conventional indicating markers, and the conventional methods and systems for the use of such indicating markers.

Disclosed herein is an indicating marker for removably attaching to a structure. The indicating marker comprises a cover device configured to removably seal the opening of the structure. The indicating marker also comprises at least one light that is attached to the cover device. The indicating marker further comprises a power source that is electrically connectable to the at least one light, and when connected, visible light can be emitted from the at least one light to illuminate the cover device. The preceding subject matter of this paragraph characterizes example 1 of the present disclosure.

The at least one light comprises a light-emitting diode or LED. The preceding subject matter of this paragraph characterizes example 2 of the present disclosure, wherein example 2 also includes the subject matter according to example 1, above.

The at least one light is in continuous electrical connection to the power source to illuminate the cover device continually. The preceding subject matter of this paragraph characterizes example 3 of the present disclosure, wherein example 3 also includes the subject matter according to any one of examples 1 or 2, above.

The indicating marker further comprises a manually-operated switch. The manually-operated switch is configured to electrically connect and to electrically disconnect the at least one light to the power source. The preceding subject matter of this paragraph characterizes example 4 of the present disclosure, wherein example 4 also includes the subject matter according to any one of examples 1 or 2, above.

The cover device comprises a cap. The cap comprises an open end through which the opening of the structure is insertable and a closed end that is opposite the open end. The at least one light and the power source are attached to the closed end of the cap. The preceding subject matter of this paragraph characterizes example 5 of the present disclosure, wherein example 5 also includes the subject matter according to any one of examples 1-4, above.

The cover device may comprise a plug. The plug comprises a plug body that is removably insertable into the opening of the structure. The plug further comprises a closed end that is adjacent to the plug body and viewable from outside of the structure when the plug body is removably inserted into the opening of the structure. The at least one light and the power source are attached to the closed end of the plug. The preceding subject matter of this paragraph characterizes example 6 of the present disclosure, wherein example 6 also includes the subject matter according to any one of examples 1-4, above.

The cover device comprises a piece of tape. The tape comprises a top surface and a bottom surface that is opposite to the top surface. The bottom surface of the piece of tape comprises an adhesive that is configured to removably attach the piece of tape to the structure over the opening of the structure. The at least one light and the power source are coupled to the top surface of the piece of tape. The preceding subject matter of this paragraph characterizes example 7 of the present disclosure, wherein example 7 also includes the subject matter according to any one of examples 1-4, above.

The visible light emitted from the at least one light can be intermittently emitted when the power source is electrically connected to the at least one light. The preceding subject matter of this paragraph characterizes example 8 of the present disclosure, wherein example 8 also includes the subject matter according to any one of examples 1-7, above.

At least a portion of an exterior surface of the cover device is made of a fluorescent color. The preceding subject matter of this paragraph characterizes example 9 of the present disclosure, wherein example 9 also includes the subject matter according to any one of examples 1-8, above.

The indicating marker further comprises a wireless signal emitter attached to the cover device. The wireless signal emitter configured to receive a wireless query signal and to transmit a wireless response signal in response to receipt of the wireless query signal. The preceding subject matter of this paragraph characterizes example 10 of the present disclosure, wherein example 10 also includes the subject matter according to any one of examples 1-9, above.

Further disclosed herein is a system for preventing debris from entering an opening in a structure during manufacture of the structure. The system comprises a cover device configured to removably seal the opening of the structure. The system also comprises a wireless signal emitter attached to the cover device. The wireless signal emitter is configured to receive a wireless query signal and to transmit a wireless response signal in response to receipt of the wireless query signal. The system also comprises a wireless signal receiver separate from the structure. The wireless signal receiver is configured to transmit the wireless query signal and to receive the wireless response signal from the wireless signal emitter. The system further comprises a signal reader that is in electrical communication with the wireless signal receiver. The signal reader is configured to process the wireless response signal and determine the location of the wireless signal emitter. The preceding subject matter of this paragraph characterizes example 11 of the present disclosure.

The wireless signal emitter is further configured to receive a radio frequency query signal and to transmit a radio frequency response signal in response to receipt of the radio frequency query signal. The wireless signal receiver is further configured to transmit the radio frequency query signal and to receive the radio frequency response signal from the wireless signal emitter. The preceding subject matter of this paragraph characterizes example 12 of the present disclosure, wherein example 12 also includes the subject matter according to example 11, above.

The system further comprises a power source. The power source is electrically connectable to the wireless signal emitter to emit an active radio frequency response signal. The preceding subject matter of this paragraph characterized example 13 of the present disclosure, wherein example 13 also includes the subject matter of any one of examples 11 or 12, above.

The cover device comprises a cap. The cap comprises an open end through which the opening of the structure is insertable and a closed end that is opposite the open end. The wireless signal emitter is attached to the closed end of the cap. The preceding subject matter of this paragraph characterizes example 14 of the present disclosure, wherein example 14 also includes the subject matter according to any one of examples 11-13, above.

The cover device may also comprise a plug. The plug comprises a plug body that is removably insertable into the opening of the structure. The plug further comprises a closed end that is adjacent to the plug body and viewable from outside of the structure when the plug body is removably inserted into the opening of the structure. The wireless signal emitter is attached to the closed end of the plug. The preceding subject matter of this paragraph characterizes example 15 of the present disclosure, wherein example 15 also includes the subject matter according to any one of examples 11-13, above.

Additionally, the cover device comprises a piece of tape. The piece of tape comprises a top surface and a bottom surface that is opposite to the top surface. The bottom surface of the piece of tape comprises an adhesive that is configured to removably attach the piece of tape to the structure over the opening of the structure. The wireless signal emitter attached to the top surface of the piece of tape. The preceding subject matter of this paragraph characterizes example 16 of the present disclosure, wherein example 16 also includes the subject matter according to any one of examples 11-13, above.

Additionally, disclosed herein is a method for preventing debris from entering an opening in a structure during manufacture of the structure. The method comprises sealing the opening of the structure with a cover device. The cover device is configured to removably seal the opening of the structure. The method also comprises analyzing the structure for a signal that is being emitted from a signaling device attached to the cover device. The method further comprises determining the location of the signaling device within the structure. Additionally, the method comprises removing the cover device from the opening of the structure after manufacture of the structure. The preceding subject matter of this paragraph characterizes example 17 of the present disclosure.

The signal device comprises at least one light attached to the cover device. The signal that is being emitted from the signal device comprises visible light that is emitted from the at least one light. The preceding subject matter of this paragraph characterizes example 18 of the present disclosure, wherein example 18 also includes the subject matter according to example 17, above.

The signal device may also comprise a wireless signal emitter. The wireless signal emitter is attached to the cover device. The signal that is emitted from the signaling device comprises a wireless response signal transmitted by the signaling device. The preceding subject matter of this paragraph characterizes example 19 of the present disclosure, wherein example 19 also includes the subject matter according to any one of examples 17 or 18, above.

The method further comprises scanning the structure with a wireless signal receiver. The wireless signal receiver configured to transmit a wireless query signal and receive a wireless response signal from the wireless signal emitter. The method also comprising receiving a wireless response signal from the wireless signal emitter in response to the transmittal of the wireless query signal by the wireless signal receiver. The method additionally comprising processing the wireless response signal by a signal reader. The signal reader in electrical communication with the wireless signal receiver. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawing depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is an indicating marker and method of use for removably attaching the indicating marker to a structure that includes an opening. The indicating marker includes a cover device that is configured to removably seal the opening of the structure. The cover device may be any device configured to removably attach to the opening of the structure and more specifically the cover device is one of a cap, a plug, or a piece of tape. At least one light is attached to the cover device, in some examples, and a power source is electrically connectable to the at least one light to emit a visible light from the at least light and illuminate the cover device. Alternatively, or additionally, in certain examples, a wireless signal emitter is attached to the cover device and is configured to receive a signal from a wireless signal receiver separate from the structure and/or transmit a wireless signal to the wireless signal receiver. In one example, both a light and a wireless signal emitter are attached to the cover device. The indicating marker, system, and method of the present disclosure help personnel identify, locate, and remove indicating markers from the corresponding openings of an aircraft before production of the aircraft is complete.

Figures 1A, 1B:
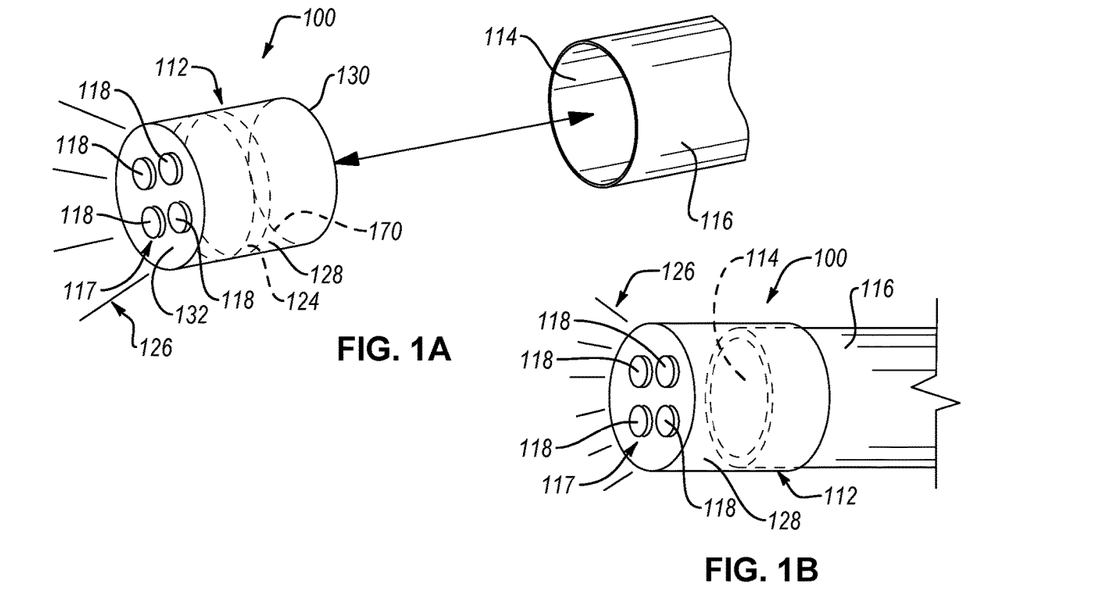
FIG. 1A is a perspective view of an indicating marker separate from an opening of a structure, according to one or more examples of the present disclosure.
FIG. 1B is a perspective side view of the indicating marker and structure of FIG. 1A with the indicating marker coupled to the structure over the opening, according to one or more examples of the present disclosure.

Referring to FIG. 1A, according to some examples, disclosed herein is an indicating marker 100 for removably attaching to a structure 116 during manufacture of the structure 116 (e.g., before production of the aircraft is complete). The structure 116 includes an opening 114 through which foreign contaminants may inadvertently be located in the structure 116. The indicating marker 100 comprises a cover device 112. In the example shown in FIG. 1A, the cover device 112 is a cap 128. The cap 128 has an open end 130 and a closed end 132 that is opposite of the open end 130. The opening 114 of the structure 116, including the structure defining the opening, is insertable into the open end 130 of the cap 128 (see, e.g., FIG. 1B). The cap 128 has one of any of various sizes that corresponding with the size of the structure 116 defining the opening 114 such that the structure 116 defining the opening 114 is insertable into the open end 130 of the cap 128. The cap 128 is made of any of various materials including, but not limited to, plastic, rubber, metal, composite material, or any combination thereof.

In certain examples, the cap 128 is any of various colors and may be transparent, translucent, or opaque. Alternatively, in some examples, the color of the cap 128 is standardized or the same as the color of all other caps 128 used on the same aircraft assembly, the same aircraft, all aircrafts of the same aircraft fleet, all aircraft of the same aircraft manufacturer, or all aircraft across all manufacturers. The standardized color of the caps 128 (including any of the other configurations of cover devices 112 disclosed herein, such as the plug 136 and the tape 144) can be a color conducive to easy identification of the cap 128. In other words, the color of the cover devices 112 disclosed herein is a color that is not associated with any parts on an operating aircraft or a color that would not be seen on an aircraft in operation. In one example, the standardized color is a fluorescent color, such as fluorescent orange or green, such that at least a portion of the exterior surface of the cap 128 is made from a fluorescent color. Additionally, or alternatively, at least a portion of an exterior surface of the cap 128 can be reflective.

Although the cover devices 112 having the standardized color, as presented above, do not have a light 117 in some examples, in other examples, the cap 128 includes a light 117 attached to the closed end 130 of the cap 128. The light 117 can be attached to the exterior surface of the closed end 130 of the cap 128, in a permanent manner in some examples. In other examples, the light 117 is at least partially embedded within the closed end 130 of the cap 128. In either example, the light 117 is located to emits light directly away from the cap 128 without passing through the cap 128. Alternatively, the light 117 can be attached to an interior surface of the closed end 130 of the cap 128 and emit light through the cap 128, such as apertures formed in the closed end 130 of the cap 128. In certain examples, the light 117 is fixed within the apertures formed in the closed end 130 of the cap 128 and the visible light 126 is transmittable through at least a portion of at least one of the apertures. According to other examples, the closed end 130 of the cap 128 is made of a clear or translucent plastic such that the closed end 130 itself acts as a type of aperture through which the visible light 126 from a light 117 fixed within the cap 128 is able to pass directly through.

The light 117 is attached to the closed end 130 of the cap 128 by any means known in the art, such as an adhesive, soldering, co-molding, embedded within the closed end 130, or other mechanical methods. Moreover, the light 117 may be permanently attached or removably attached to the closed end 130 of the cap 128.

The light 117 is configured to produce light at any of various visible wavelengths, such as fluorescent light or white light. In some examples, the light 117 is one or more incandescent lamps, compact fluorescent lamps, halogen lamps, neon lamps, lasers or light emitting diodes (LEDs). As shown in FIG. 1A, the light 117 includes a plurality of LEDs 118. The number and type of light-emitting devices forming the light 117 is selected to produce visible light 126 having a desired field and intensity.

The cap 128 has a power source 124 that is electrically connectable to the light 117. In one example, the power source 124 is permanently electrically connected to the light 117 such that the light 117 is always emitting visible light 126 as long as power is left in the ower source 124. As shown in FIG. 1A, the visible light 126 is being emitted from the plurality of LEDs 118 even when the cap 128 is not coupled with the structure 116. In this manner, even when the cap 128 is stored, and not in use on the structure 116, the visible light 126 is emitted from the light 117.

Figure 5:
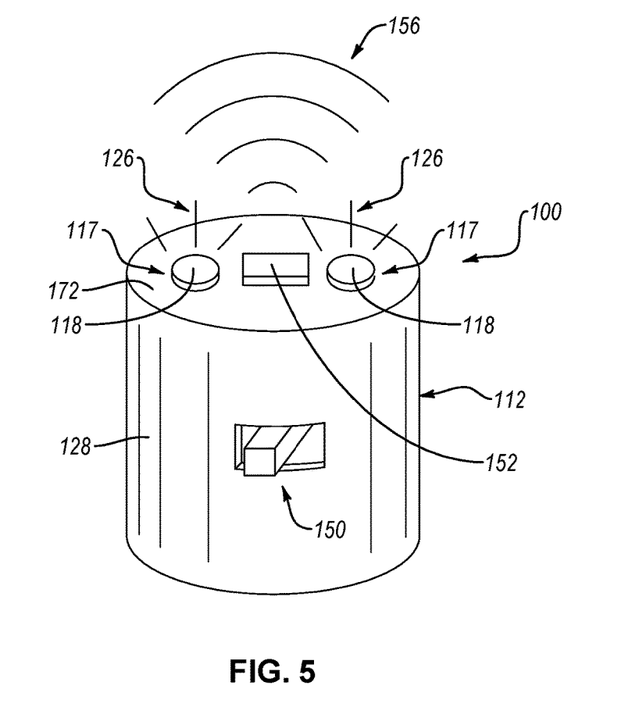
FIG. 5 is a perspective view of an indicating marker, according to one or more examples of the present disclosure.

Alternatively, in other examples, the power source 124 can be selectively and/or temporarily connected to the light 117 such that the visible light 126 is emitted from the light 117 only when personnel selectively connect power from the power source 124 to the light 117. In one implementation, selective electrical coupling of the light 117 to the power source 124 is accomplished via a manually-operated switch 150, such as shown in FIG. 5. More specifically, when the switch 150 is in an ON position, the light 117 is electrically connected to the power source 124 and visible light 126 is emitted from the light 117, and when the switch 150 is in an OFF position, the light 117 is electrically disconnected to the power source 124 and visible light 126 is not emitted from the light 117. According to an alternative implementation, a removable tab could be utilized that would block electrical connection between the light 117 and the power source 124 until the tab is removed from the cover device 112 to allow constant electrical connection between the light 117 and the power source 124.

When the power source 124 is electrically connected to the light 117, in one example, the visible light 126 is emitted continuously or a continuous stream of light is emitted. Alternatively, in other embodiments, the light 117, which may include corresponding circuitry, emits the visible light 126 non-continuously or intermittently, such as to produce a blinking, patterned, or other sequentially-emitted visible light stream.

The power source 124 is attached to the closed end 130 of the cap 128. In certain examples, the power source 124 is attached to an exterior surface of the closed end 130 of the cap 128. However, in some examples, as shown in FIG. 1A, the power source 124 is attached to an interior surface of the closed end 130 of the cap 128. In one implementation, the power source 124 is be embedded within the closed end 130 of the cap 128 or other portion of the cap 128. In one example, the power source 124 is a coin cell battery, and could be an alkaline, lithium, or silver oxide battery. Any number of batteries can be utilized depending on the power needs of the light 117. The power source 124 can be replaceable or irreplaceable depending on how the power source 124 is attached to the cap 128.

Referring to FIG. 1B, the cap 128 is shown removably sealed to the opening 114 in the structure 116. To facilitate this sealable coupling between the cap 128 and the structure, the structure 116 is inserted into the open end 130 of the cap 128 such that the closed end 130 of the cap 128 covering the opening 114 in the structure 116. Because the closed end 130 of the cap 128 covers the opening 114, debris is prevented from entering the opening 114 during manufacture of the structure 116. The cap 128 can be insertable over the opening 114 of the structure 116 by sliding the cap 128 over the structure 116, threading the cap 128 onto the structure 116, or any other means of removable attachment. In this example, structure 116 is a pipe or conduit (e.g., a fluid or pneumatic pipe or conduit) and the opening 114 is the open end of the pipe or conduit. However, the structure 116 can be any structure with an opening on which a cap 128 could removably seal.

When the cap 128 is coupled to the structure 116 over the opening 114, the light 117 is emitting the visible light 126, which is more easily noticeable by personnel than a cap without a light. The visible light 126 indicates to personnel that a cap 128, which should be removed prior to completion of production of the aircraft, should be removed from the structure 116. In this manner, the configuration of the cap 128 helps personnel to remove the cap 128 and avoid leaving the cap 128 on the aircraft after production.

Figures 2A, 2B:
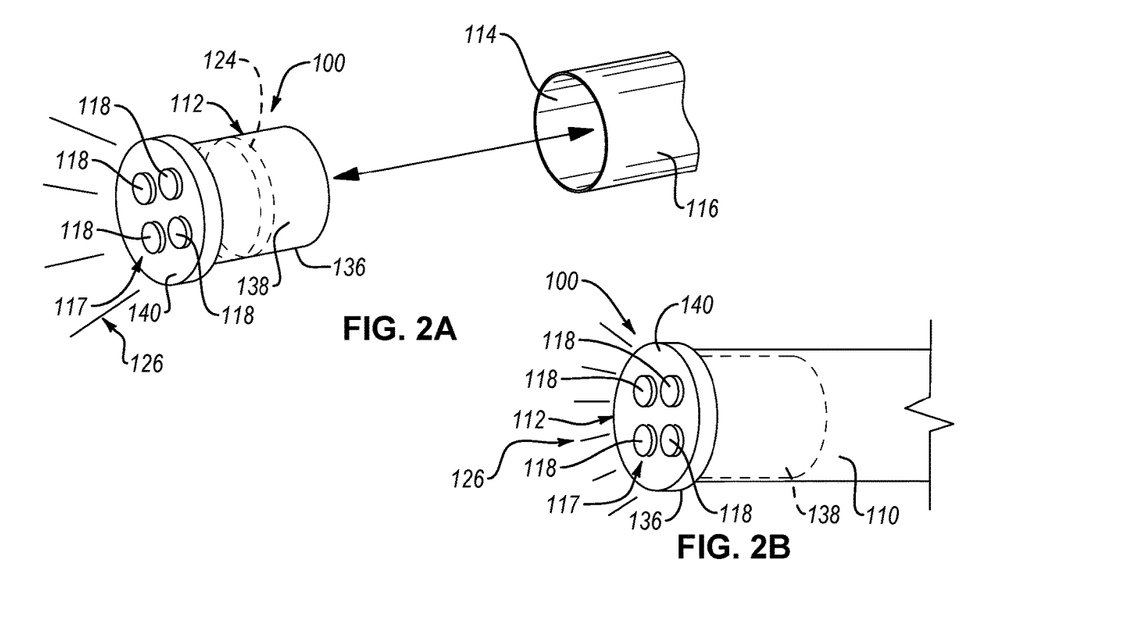
FIG. 2A is a perspective view of an indicating marker separate from an opening of a structure, according to one or more examples of the present disclosure.
FIG. 2B is a perspective side view of the indicating marker and structure of FIG. 2A with the indicating marker inserted into the opening of the structure, according to one or more examples of the present disclosure.

Referring to FIG. 2A, in some examples, the cover device 112 is a plug 136. The plug 136 has a plug body 138 and a closed end 140 that is adjacent to the plug body 138. The plug body 138 is removably insertable into the opening 114 of the structure 116. When inserted into the opening 114, the closed end 140 protrudes from and/or is viewable from outside of the structure 116. The plug body 138 has any of various sizes that promote removable insertable coupling with the opening 114 of the structure 116. In the illustrated examples, the plug body 138 is cylindrical, as shown in FIG. 2A, to complement the circular shape of the opening 114. However, in other examples, the plug body 138 has a non-circular shape to complement openings that are non-circularly shaped. Additionally, in certain examples, plug body 138 includes plurality of extensions, tabs, or teeth extending from the closed end 140 of the plug 136 that are configured to engage the internal surface of the structure 116 to removably hold the plug body 138 in the opening 114.

The plug 136 can be made from any of the materials presented above in association with the cap 128. Additionally, the plug 136 can be any of the various colors or reflectiveness as presented above in association with the cap 128.

The plug 136 has at least one light 117 attached to the closed end 140 of the plug 136. The light 117, which can includes a plurality of LEDs 118, is configured in a manner similar to that presented above in association with the cap 128. Moreover, the plug 136 includes a power source 124 coupled to the plug 136 and electrically connectable to the light 117 in a manner similar to that of the cap 128.

Referring to FIG. 2B, the plug 136 is removably sealed to the opening 114 in the structure 116. More specifically, the plug body 138 is removably inserted into the opening 114 in the structure 116 to protect the opening 114 from debris during manufacture of the structure 116. The plug 136 can be inserted into the opening 114 of the structure 116 by sliding into the structure 116, threading into the structure 116, or by any other means of removably attachment. Like the cap 128, when the plug 136 is coupled to the structure 116 within and covering the opening 114, the light 117 is emitting the visible light 126, which is more easily noticeable by personnel than a plug without a light. The visible light 126 indicates to personnel that a plug 136, which should be removed prior to completion of production of the aircraft, should be removed from the structure 116. In this manner, the configuration of the plug 136 helps personnel to remove the plug 136 and avoid leaving the plug 136 on the aircraft after production.

Figure 3A:
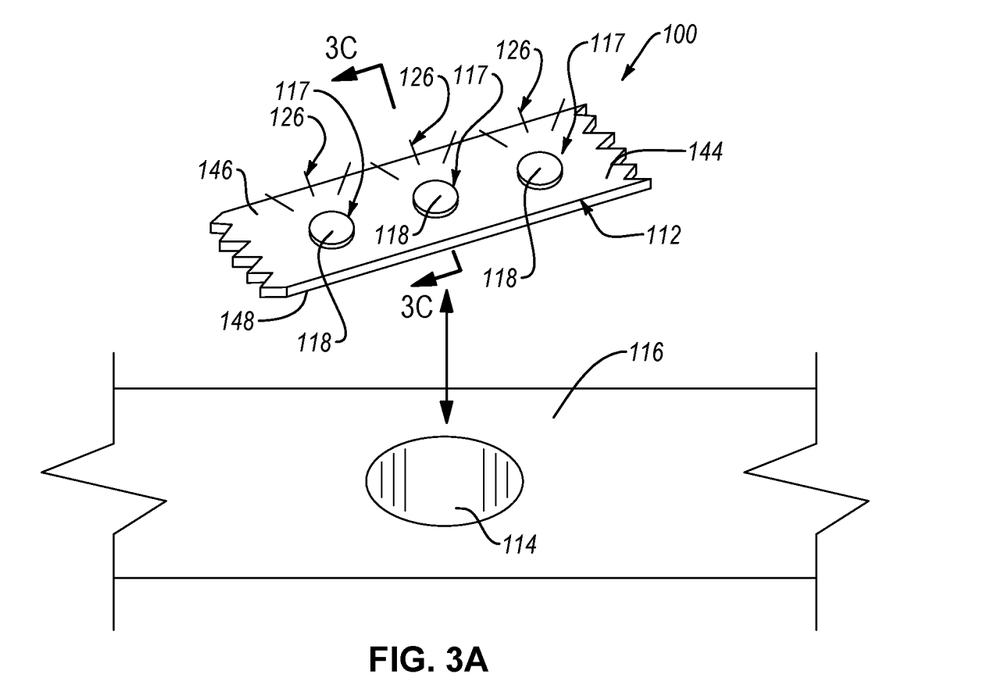
FIG. 3A is a perspective view of an indicating marker separate from an opening of a structure, according to one or more examples of the present disclosure.

Referring to FIG. 3A, according to some examples, the cover device 112 is a piece of tape 144. The piece of tape 144 has a top surface 146 and a bottom surface 148 that is opposite of the top surface 146. The tape 144 additionally includes an adhesive 147 that is fixed to the bottom surface 148 and is configured to removably adhere the piece of tape 144 to a structure 116 over an opening 114 in the structure 116. The piece of tape 144 can be any length necessary to removably seal the opening 114 in the structure 116. When sealing the opening 114 of the structure 116, the piece of tape 144 may be separated from a roll of tape having a plurality of pieces of tape 144 seamlessly or individually interconnected to each other. In certain examples, the piece of tape 144 separated from the roll of tape can be any length necessary to seal a particular opening 114 and can vary from the length of other pieces of tape 144 used to seal other openings 114 in the structure 116. Alternatively, the piece of tape 144 can be a predetermined length and pre-cut or perforated relative to other pieces of tape 144.

The portion of the piece of tape 144 defining the top surface 146 and the bottom surface 148 can be made from any of various materials, including, but not limited to, paper, plastic, cloth, foam, foil, or any combination thereof. The adhesive 147 is any of various types of pressure-activated adhesives known in the art. The piece of tape 144 may be any color and may be transparent, translucent or opaque. Alternatively, the color of the piece of tape 144 could be standardized for easier identification of the piece of tape 144 as presented above. For example, at least a portion of the exterior surface of the cap may be made from a fluorescent color. Additionally or alternatively, at least a portion of the top surface 146 of the piece of tape may be reflective.

Figure 3B:
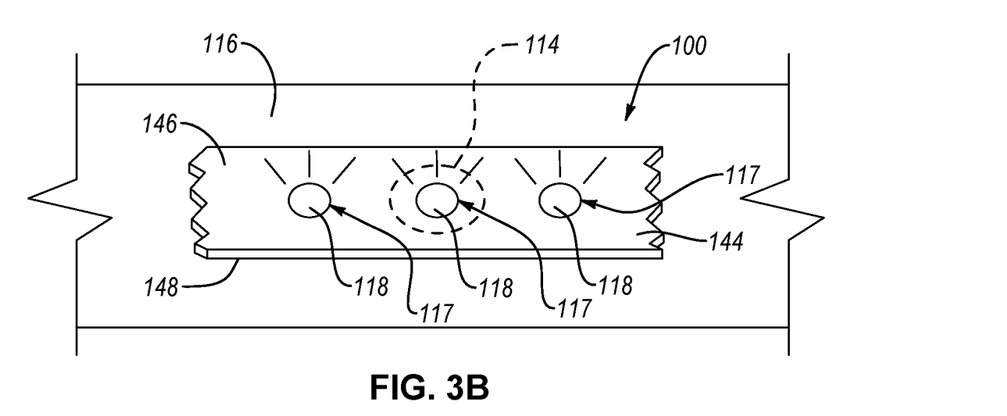
FIG. 3B is a perspective view of the indicating marker and structure of FIG. 3A with the indicating marker over the opening of the structure, according to one or more examples of the present disclosure.
Figure 3C:
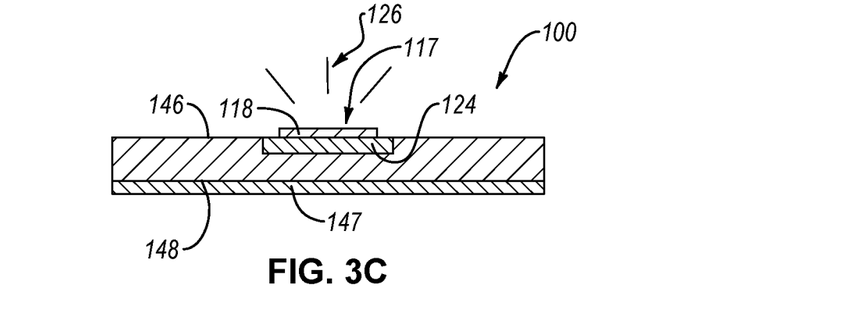
FIG. 3C is a cross-sectional end view of the indicating marker of FIG. 3A, taken along the line 3C-3C of FIG. 3A, according to one or more examples of the present disclosure.

FIG. 3C illustrates a sectional view along line 3C-3C of FIG. 3A. The piece of tape 144 has at least one light 117 coupled to the top surface 146 of the piece of tape 144. The light 117 can be attached to the top surface 146 of the piece of tape 144. Each light 117 can include one or more LEDs 118. In one example, the light 117 is at least partially embedded within the top surface 146 of the piece of tape 144. Accordingly, the visible light 126 of the light 117 is directly emitted from the top surface 146 without passing through the top surface 146. However, in alternative examples, apertures may be formed in the top surface 146 of the piece of tape 144 so that visible light 126 from the light 117 embedded below the top surface 146 of the piece of tape 144 can be transmittable through the at least one aperture. In view of the foregoing, the light 117 can be attached to the top surface 146 of the piece of tape 144, such as by any means known in the art (e.g., via an adhesive), embedded within the top surface 146, or attached to the piece of tape 144 according to other mechanical methods. In certain examples, the light 117 may be permanently attached or removably attached to the top surface 146 of the piece of tape 144. The power source 124 is also coupled to or embedded within the top surface 146 of the piece of tape 144.

As shown in FIG. 3C, the light 117 and the power source 124 are permanently electrically connected in contact with each other. However, the light 117 and the power source 124 can be selectively electrically connected and disconnected in other examples, such as via a switch or tab as presented above.

As shown in FIG. 3B, the piece of tape 144 is removably sealed to the structure 116 over the opening 114 in the structure 116. The piece of tape 144 is attached to the structure 116 by means of the adhesive 147 on the bottom surface 148 to removably seal the opening 114. In the illustrated example, the structure 116 defines a relatively flat or broad surface and the opening 114 is formed in the surface. Accordingly, the piece of tape 144 is particularly suited to adhere to the surface of the structure 116 over the opening 114. The opening 114 could be a slit, gash, hole, gap, vent or any other opening that can be removably sealed to protect from debris during manufacture of the structure 116. However, in other examples, the opening 114 is formed in an irregularly shaped surface of a structure 116 or the structure 116 is a pipe, tube, or conduit and the piece of tape 144 can still be removably adhered to the structure 116 such that the opening 114 is sealed. When the piece of tape 144 is coupled to the structure 116 over the opening 114, the light 117 is emitting the visible light 126, which is more easily noticeable by personnel than tape without a light. The visible light 126 indicates to personnel that a piece of tape 144, which should be removed prior to completion of production of the aircraft, should be removed from the structure 116. In this manner, the configuration of the piece of tape 144 helps personnel to remove the piece of tape 144 and avoid leaving the piece of tape 144 on the aircraft after production, thereby promoting safety.

Figure 4:
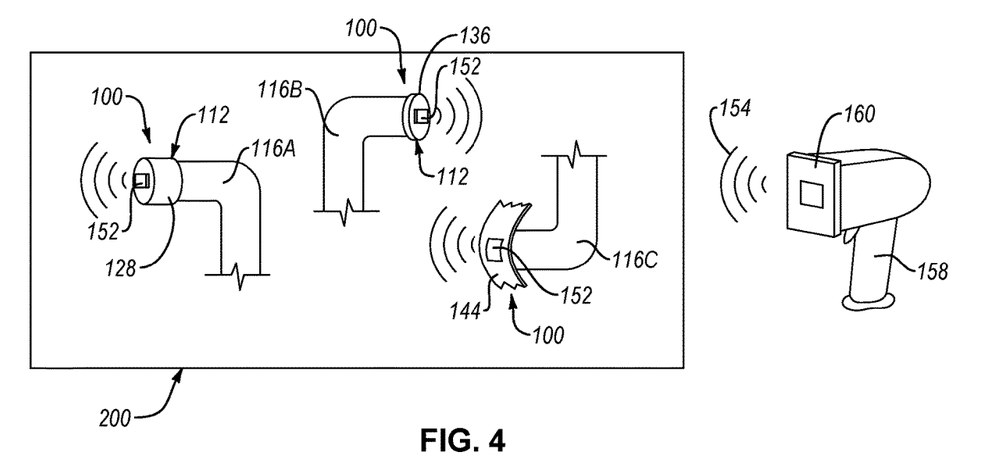
FIG. 4 is a schematic view of a system for preventing debris from entering an opening in a structure, according to one or more examples of the present disclosure.

One example of a system 200 for preventing debris from entering an opening 114 in a structure 116 during manufacture of the structure 116 is shown in FIG. 4. The system 200 includes one or more indicating markers 100 and a wireless signal receiver 158. Each one of the indicating markers 100 includes a cover device 112, which is configured to removably seal the opening 114 of the structure 116, and a wireless signal receiver 158. Moreover, each one of the indicating markers 100 includes a wireless signal emitter 152 attached to the cover device 112. The wireless signal emitter 152 is configured to receive a wireless query signal 154 and to transmit a wireless response signal 156 in response to receipt of the wireless query signal 154. The wireless signal emitter 152 may be a tag using available real-time location systems, such as a WiFi location tag, ultra wide-band location tag, infrared location tag, Bluetooth® tag, passive radio frequency identification tag, or active radio frequency identification location tag. For simplicity, system 200 will be described using radio frequency identification tags; however, any of the above real-time location systems could be substituted for radio frequency identification tags.

In one example, the wireless signal emitter 152 is attached to the closed end 132 of a cap 128, the closed end of a plug 136, or the top surface 146 of a piece of tape 144 depending on the type of cover device used. The wireless signal emitter 152 does not have to be visible from the exterior of the structure 116 as long as the wireless signal emitter 152 can send and receive signals from the wireless signal receiver 158. The wireless signal receiver 158 is separate from the structure and is configured to transmit a wireless query signal 154 and receive a wireless response signal 156 from the wireless signal emitter 152. A signal reader 160 is in electrical communication with the wireless signal receiver 158 and configured to process the wireless response signal 156. In one example, the signal reader 160 and the wireless signal receiver 158 are housed together; however, the signal reader 160 and the wireless signal receiver 158 could also be separate from each other. The location of the wireless signal emitter 152, attached to the cover device 112, can then be determined from the wireless response signal 156.

As shown in FIG. 4, the structure 116 may have multiple openings 114. In this example, the system 200 has a cap 128 inserted over an opening 114 of the structure 116A, a plug 136 inserted into an opening 114 of the structure 116B, and a piece of tape 144 attached over an opening 114 of the structure 116C. A wireless signal emitter 152 is attached to each cover device 112 of the system 200. A wireless signal receiver 158 transmits a wireless query signal 154 to the system 200. The wireless signal receiver 158 may transmit a wireless query signal 154 for a specified wireless signal emitter 152 or may transmit a wireless query signal 154 to all of the wireless signal emitters 152 in the system 200. In one example, the wireless query signal 154 is transmitted to all of the wireless signal emitters 152 in the system 200. The wireless signal emitter 152 on the cap 128 transmits a wireless response signal 156 to the wireless signal receiver 158. Similarly, the wireless signal emitter 152 on the plug 136 and the wireless signal emitter 152 on the piece of tape 144 transmit wireless response signals 156 to the wireless signal receiver 158. The signal reader 160 processes the wireless response signal 156 and determines the location of each indicating marker 100 in the system 200.

In one implementation of the system 200, the wireless signal emitter 152 of the indicating marker 100 includes a radio frequency tag. A radio frequency receiver transmits a radio frequency query signal to the system 200 in order to identify if any indicating markers 100 are in the system. The radio frequency tag transmits a radio frequency response signal to the radio frequency receiver. The radio frequency receiver receives the radio frequency response signal and a signal reader processes the radio frequency response signal and determines the location of the indicator marker. In one example, the radio frequency tag has a power source 124. The power source 124 is used to run the radio frequency tags circuitry and continuously broadcast a radio frequency signal to a signal reader, allowing the signal reader to accurately track the real-time location of the radio frequency tag. The power source 124 also allows the signal reader to have a longer read range.

As shown in FIG. 5, an indicator marker 100 can comprise dual-mode functionality. The indicating marker 100 has at least one light 117, an LED 118, and a wireless signal emitter 152 attached to a cap 128, which can be a plug 136 or a piece of tape 144 in some examples. The LED 118 is emitting visible light 126 and the wireless signal emitter 152 is transmitting a wireless response signal 156. The indicator marker further comprises a switch 150 configured to electrically connect/disconnect the light 117 to a power source. The dual-mode functionality provides multiple disparate signals from an indicator marker making it less likely to be overlooked. A visual inspection could be utilized to find any indicator markers 100 with an LED 118 emitting visible light 126. These indicator markers 100 would be removed from the structure after manufacture. A wireless query signal could also be utilized to find any indicator markers 100 with a wireless signal emitter 152 transmitting a wireless response signal 156. These indicator markers 100 would be removed from the structure after manufacture.

Figure 6:
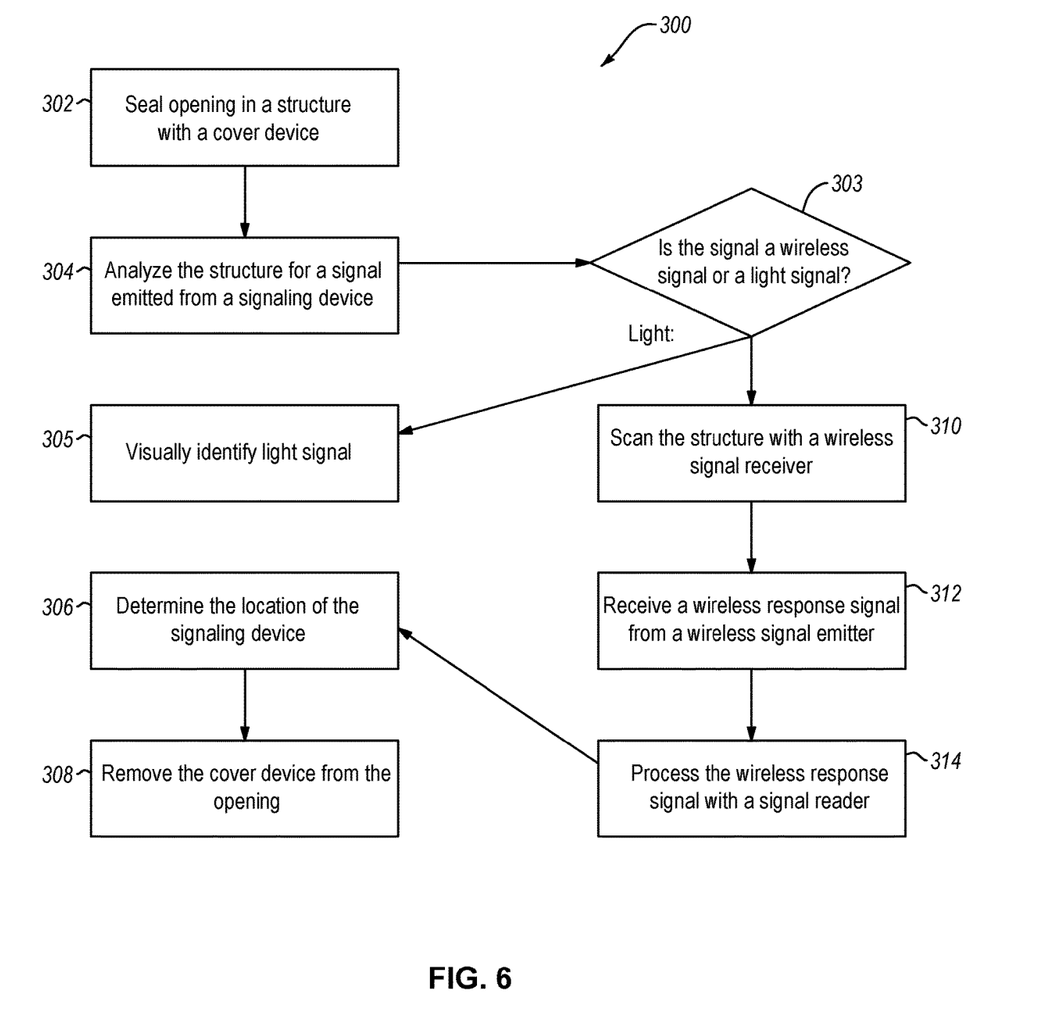
FIG. 6 is a schematic flow diagram of a method of preventing debris from entering an opening in a structure, according to one or more examples of the present disclosure.

Now referring to FIG. 6, according to certain examples, a method 300 of preventing debris from entering an opening 114 in a structure 116 during manufacture of the structure 116 is shown. The method 300 is performed using any one or more of the examples of the indicating marker 100 or the system 200 disclosed herein. The method 300 includes (block 302) sealing the opening 114 of the structure 116 with a cover device 112 configured to removably seal the opening 114 of the structure 116. The method 300 also includes (block 304) analyzing the structure 116 for a signal that is being emitted from a signaling device attached to the cover device. The method further includes (block 306) determining the location of the signaling device within the structure 116. After the location is determined, the method includes (block 308) removing the cover device 112 from the opening 114 of the structure 116 after manufacture of the structure 116.

In certain examples of the method 300, the cover device 112 includes at least one of the following: a cap 128, a plug 136, or a piece of tape 144. In the case of a structure 116 having more than one opening 114, a plurality of cover devices 112 may be used to seal a plurality of openings 114 in the structure 116. The cover device 112 is removably sealed to the opening 114 of the structure 116; however, the cover device 112 is intended to be removed before completion of an overall structure. Therefore, the structure 116 is analyzed for a signal being emitted from a signaling device before the overall structure is completed.

In one example, if determined at (block 303) of the method 300 that the signal emitted from the signaling device is a light or visible signal, instead of a wireless signal, the signaling device attached to the cover device 112 is a light 117 emitting a signal of visible light 126 and the method 300 proceeds to (block 305) visually identify the light signal. In another example, if determined at (block 303) of the method 300 that the signal emitted from the signaling device is a wireless signal emitter 152, then the method 300 proceeds to (block 310) scan the structure 116 with a wireless signal receiver 158 configured to transmit a wireless query signal 154 and receive a wireless response signal 156 from the wireless signal emitter 152. After the step of block 310, the method 300 also includes (block 312) receiving a wireless response signal 156 from the wireless signal emitter 152 in response to the transmittal of the wireless query signal 154 by the wireless signal receiver 158. After the step of block 312, the method 300 further includes (block 314) processing the wireless response signal 156 by a signal reader 160 in electrical communication with the wireless signal receiver 158. The method 300 then proceeds to determine the location of the signaling device at block 306 based on the results of block 314. It is noted that if a cover device 112 has dual-mode functionality both a visual search for visible light 126 and scanning the structure to locate a wireless signal emitter 152 can be employed.

In the above description, certain terms may be used such as "up," "down," "upper," "lower," "horizontal," "vertical," "left," "right," "over," "under" and the like. There terms are used, where applicable, to provide some clarity of description when dealing with relative relationships. But, there terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can de defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used here, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item A, item B, and item C; or item B and item C. In some cases, "at least one of item A, item B, and item C" may mean, for example, without limitation, two of item A, one of item B, and ten of item C; four or item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further medication. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further medication.

For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An aircraft assembly comprising:
    an aircraft component for use in an aircraft, the aircraft component comprising an opening; and
    an indicating marker removably attached to the aircraft component and comprising:
        a cover device removably sealing the opening of the aircraft component wherein fluid is allowed to pass through the opening only when the cover device is removed;
        at least one light attached to the cover device; and
        a power source electrically connectable to the at least one light to emit a visible light from the at least one light and to illuminate the cover device.

2. The indicating marker according to claim 1, wherein the at least one light comprises a light-emitting diode (LED).

3. The indicating marker according to claim 1, wherein the at least one light is in continuous electrical connection to the power source to continually illuminate the cover device.

4. The indicating marker according to claim 1, further comprising a manually-operated switch configured to electrically connect and to electrically disconnect the at least one light to the power source.

5. The indicating marker according to claim 1, wherein the cover device is a cap comprising:
    an open end through which the opening of the aircraft component is insertable and a closed end that is opposite the open end; and
    the at least one light and the power source attached to the closed end of the cap.

6. The indicating marker according to claim 1, wherein the cover device is a plug comprising:
    a plug body that is removably insertable into the opening of the aircraft component and a closed end that is adjacent to the plug body and viewable from outside of the aircraft component when the plug body is removably inserted into the opening of the aircraft component; and the at least one light and the power source attached to the closed end of the plug.

7. The indicating marker according to claim 1, wherein when the power source is electrically connected to the at least one light, the visible light is intermittently emitted from the at least one light.

8. The indicating marker according to claim 1, wherein at least a portion of an exterior surface of the cover device is made of a fluorescent color.

9. The indicating marker according to claim 1, further comprising a wireless signal emitter attached to the cover device configured to receive a wireless query signal and to transmit a wireless response signal in response to receipt of the wireless query signal.

10. An aircraft assembly comprising:
an aircraft component for use in an aircraft, the aircraft component comprising an opening; and
a system for preventing debris from entering the opening of the aircraft component, the system comprising:
a cover device removably attached to the aircraft component and removably sealing the opening of the aircraft component, wherein fluid is allowed to pass through the opening only when the cover device is removed;
a wireless signal emitter attached to the cover device configured to receive a wireless query signal and to transmit a wireless response signal in response to receipt of the wireless query signal;
a wireless signal receiver separate from the aircraft component and configured to transmit the wireless query signal and to receive the wireless response signal from the wireless signal emitter; and
a signal reader in electrical communication with the wireless signal receiver and configured to process the wireless response signal and determine a location of the wireless signal emitter on the aircraft.

11. The system according to claim 10, wherein the wireless signal emitter is configured to receive a radio frequency query signal and to transmit a radio frequency response signal in response to receipt of the radio frequency query signal and wherein the wireless signal receiver is configured to transmit the radio frequency query signal and to receive the radio frequency response signal from the wireless signal emitter.

12. The system according to claim 11, further comprising a power source electrically connectable to the wireless signal emitter to emit an active radio frequency response signal.

13. The system according to claim 10, wherein the cover device is a cap comprising:

an open end through which the opening of the aircraft component is insertable and a closed end that is opposite the open end; and the wireless signal emitter attached to the closed end of the cap.

14. The system according to claim 10, wherein the cover device is a plug comprising:
a plug body that is removably insertable into the opening of the aircraft component and a closed end that is adjacent to the plug body and viewable from outside of the aircraft component when the plug body is removably inserted into the opening of the aircraft component; and
the wireless signal emitter attached to the closed end of the plug.

15. A method for preventing debris from entering an opening in a fluid conduit of an aircraft during manufacture of the aircraft, the method comprising:
sealing the opening of the fluid conduit with a cover device configured to removably seal the opening of the fluid conduit;
analyzing the aircraft for a signal that is being emitted from a signaling device attached to the cover device;
determining a location of the signaling device within the aircraft in response to detecting the signal emitted from the signaling device; and
removing the cover device from the opening of the fluid conduit before the aircraft is operational.

16. The method of claim 15, wherein the signaling device comprises at least one light attached to the cover device and wherein the signal that is being emitted from the signaling device comprises visible light that is emitted from the at least one light.

17. The method of claim 15, wherein the signal device comprises a wireless signal emitter attached to the cover device and wherein the signal that is emitted from the signaling device comprises a wireless response signal transmitted by the signaling device.

18. The method of claim 17 further comprising:
scanning the aircraft component with a wireless signal receiver configured to transmit a wireless query signal and receive a wireless response signal from the wireless signal emitter;
receiving a wireless response signal from the wireless signal emitter in response to transmission of the wireless query signal by the wireless signal receiver; and
processing the wireless response signal by a signal reader in electrical communication with the wireless signal receiver.

19. The aircraft assembly of claim 1, wherein the aircraft component comprises a fluid conduit.

20. The aircraft assembly of claim 10, wherein the aircraft component comprises a fluid conduit.

* * * * *